United States Patent [19]

Ishikawa et al.

[11] Patent Number: 5,115,422
[45] Date of Patent: May 19, 1992

[54] INFORMATION REPRODUCING APPARATUS FOR DETECTING A REPRODUCED AREA ON A DISC

[75] Inventors: Akihiro Ishikawa, Neyagawa; Haruo Isaka, Hirakata; Yoshio Sakakibara, Neyagawa, all of Japan

[73] Assignee: Matsushita Electric Industrial Co., Ltd., Osaka, Japan

[21] Appl. No.: 370,745

[22] Filed: Jun. 20, 1989

[30] Foreign Application Priority Data

Jun. 21, 1988 [JP] Japan .................. 63-153251

[51] Int. Cl.$^5$ .......................... G11B 7/00; G11B 3/90
[52] U.S. Cl. ........................................ 369/54; 369/32; 369/56; 369/111
[58] Field of Search ...................... 369/50-54, 369/32, 56, 58; 358/338

[56] References Cited

U.S. PATENT DOCUMENTS 4,672,595  6/1987  Senso .................. 358/338
4,757,488  7/1988  Nagai et al. .......... 369/111
4,885,644  12/1989  Ishii et al. ........... 369/54

Primary Examiner—Roy N. Envall, Jr.
Assistant Examiner—Nabil Hindi
Attorney, Agent, or Firm—Wenderoth, Lind & Ponack

[57] ABSTRACT

An information reproducing apparatus detects a reproducing area on a disk having information recorded thereon at an approximately constant linear velocity. A reproduced signal is generated by rotating the disk mounted on a shaft of a motor, and reading out the information recorded on the rotating disk with an information reproducing head. A frequency detecting circuit generates a frequency signal indicative of the number of rotations of the motor. This frequency signal is compared with the reproduced signal to detect the number of pulses of the reproduced signal contained in one period of the frequency signal. A reproducing area on the disk is detected by comparing the detected number of pulses with a predetermined value, since this number of pulses has a value corresponding to a radial position on the disk.

5 Claims, 13 Drawing Sheets

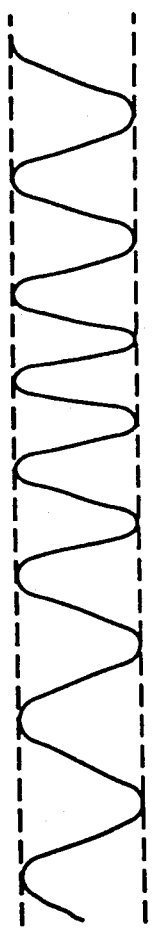
FIG. 3(a)
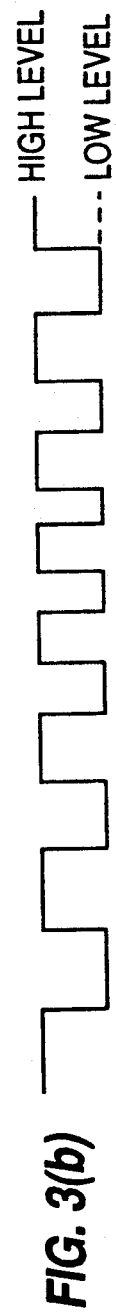
FIG. 3(b)
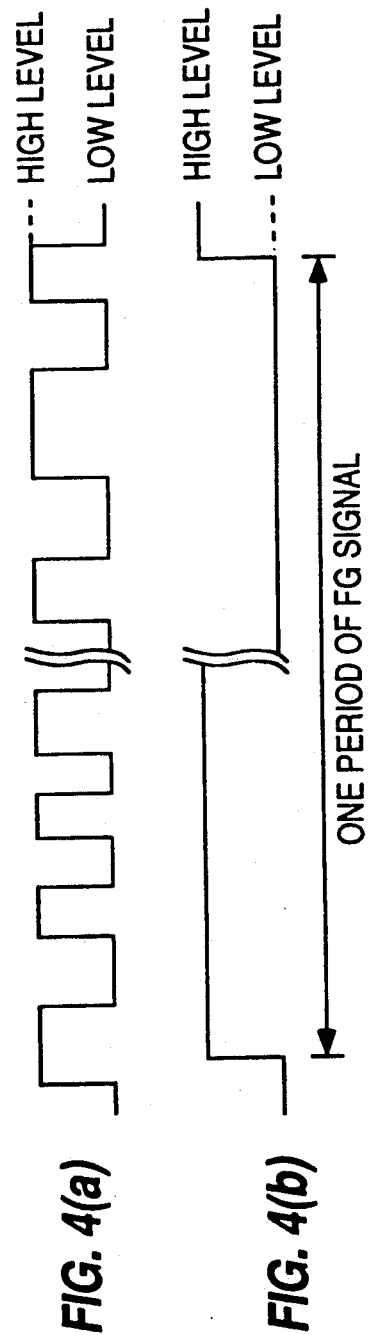
FIG. 4(a)
FIG. 4(b)

FIG. 11
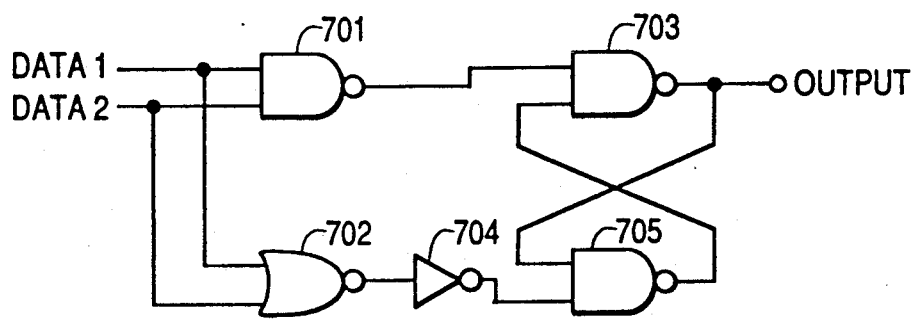
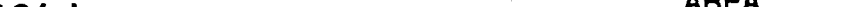
FIG. 12(a) INNER AREA / OUTER AREA — HIGH LEVEL / LOW LEVEL
FIG. 12(b)
FIG. 12(c)
FIG. 13(a) OUTER AREA / HEAD MOVING DIRECTION / INNER AREA — HIGH LEVEL / LOW LEVEL
FIG. 13(b)
FIG. 13(c)

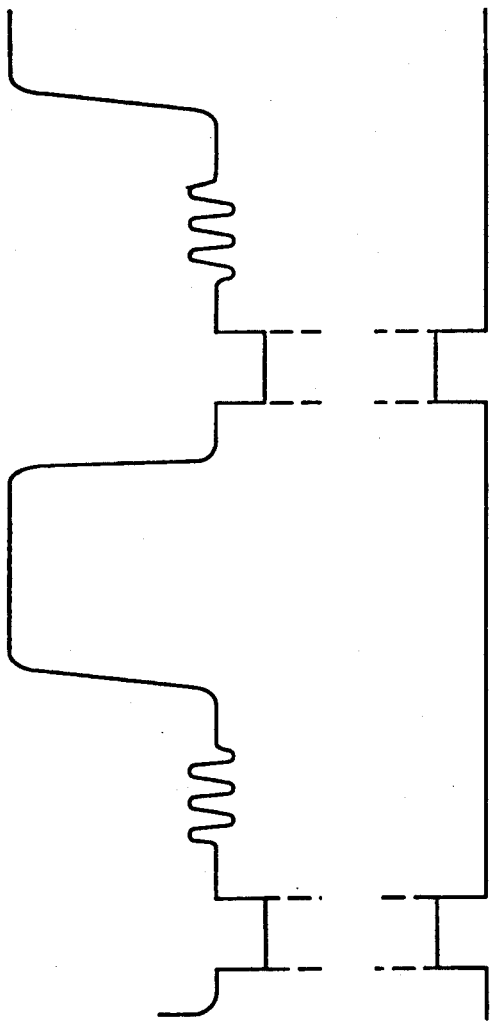
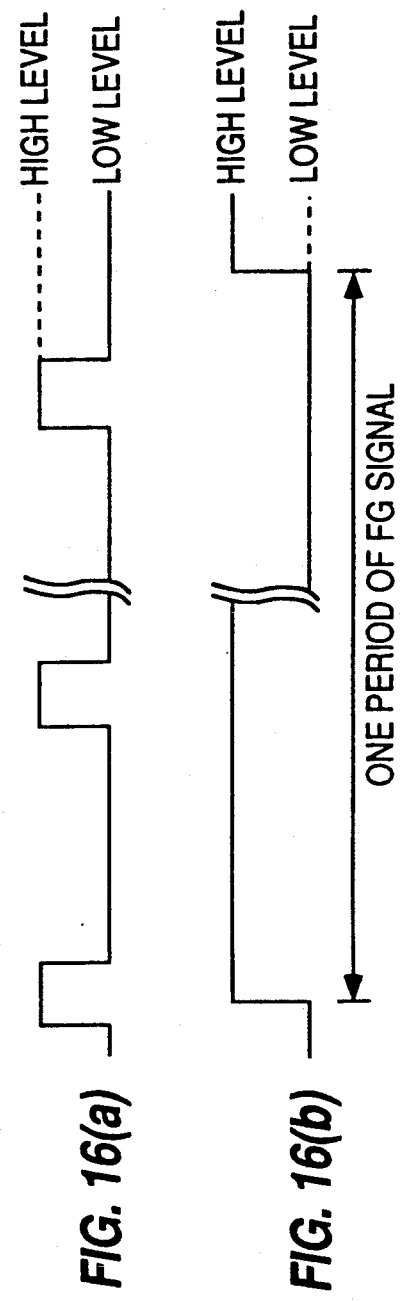
FIG. 15(a)
FIG. 15(b)
FIG. 16(a)
FIG. 16(b)

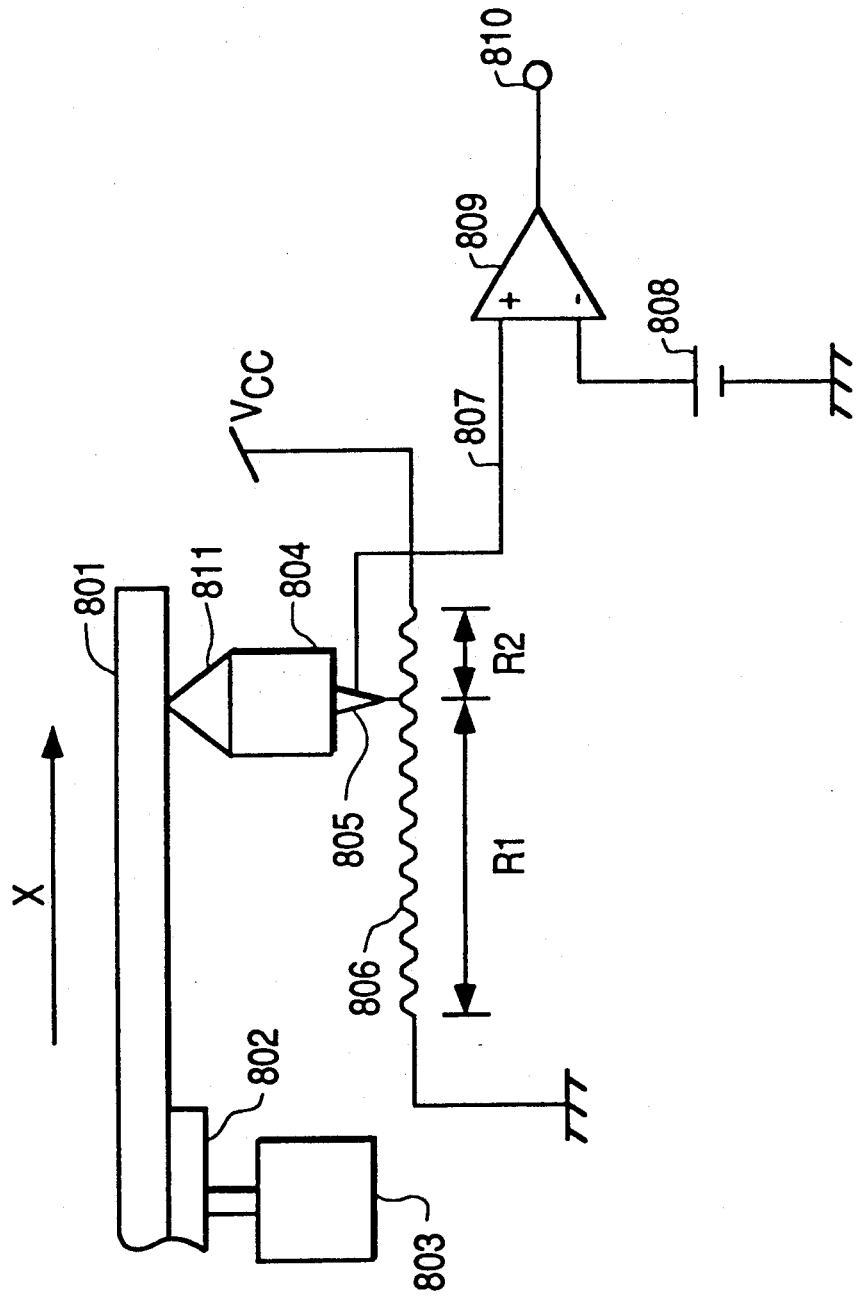

INFORMATION REPRODUCING APPARATUS FOR DETECTING A REPRODUCED AREA ON A DISC

BACKGROUND OF THE INVENTION

1. Field of the Invention

This invention relates to an information reproducing apparatus for detecting a reproducing position on a disk on which information has been recorded at a constant linear velocity.

2. Prior Art

Information reproducing apparatuses for optically reproducing information from a recording medium such as video disk or optical disk have been widely used. In these information reproducing apparatuses, particularly in the constant linear velocity (CLV) disk drive apparatus, a gain in a motor control circuit is changed according to the reproducing position on the disk, since the number of rotations of the disk varies according to a radius position of the disk.

The principle of detecting the reproducing position on a disk as mentioned above, is described in Japanese unexamined patent application publication No. 55-139641, which is described below with reference to FIG. 17.

FIG. 17 shows the principle of detecting the reproducing position of the conventional information reproducing apparatus by use of a potentiometer. A disk 801 set on a turn table 802, which is fixed to a shaft of a motor 803, is turned by driving the motor 803. An information signal recorded on the disk 801 is reproduced by focusing a light flux 811 on the information recorded surface of the disk 801 and driving a pick-up 804 in the x-direction.

A brush 805 fixed in the pick-up 804 moves to the x-direction while keeping in contact with a resistor 806. Accordingly, a voltage, which is realized by dividing a voltage Vcc with resistors R1 and R2, is generated at the brush 805, the voltage being varied with movement of the contact of the brush 805 with the resistor 806. The brush voltage 807 is compared with a reference voltage 808 by a comparator 809 in order to find the present disk reproducing position. The gain in the motor control circuit is switched in accordance with the result thus obtained.

However, with the above mentioned arrangement, the reproducing position of the disk can not be detected in some cases due to poor contact of the brush with the resistor, and further there is the structural limitation of mounting the potentiometer.

SUMMARY OF THE INVENTION

It is an object of the invention to provide an information reproducing apparatus capable of detecting a reproducing position on a disk without requiring mechanical elements such as a potentiometer and the like.

In order to achieve the above object, the present invention provides an information reproducing apparatus which reproduces information using an information reproducing head from a rotating constant linear velocity disk driven by a motor. A frequency detecting means generates a frequency signal having a frequency corresponding to the number of rotations of the motor. A period comparison means compares the period of the frequency signal with a period of a reproduced signal. For example, the number of pulses of the reproduced signal generated during one period or one pulse duration of the frequency signal may be detected. In the case of the constant linear velocity disk, the number of pulses of the reproduced signal read out from the disk per rotational angle of the motor increases as the reproducing position moves from the inner area to the outer area on the disk, since the information is recorded at a constant linear velocity. In other words, the number of pulses of the reproduced signal generated during one period or one pulse duration of the frequency signal generated by the frequency detecting means increases as the reproducing position moves in a direction from the inner area (closer to the center of the disk) to the outer area (closer to the periphery of the disk) of the disk. By using this relationship, a reproducing area detecting means compares the signal generated by the period comparison means with a predetermined reference value to detect a current reproducing area on the disk.

As described above, the information reproducing apparatus of the invention is free from structural limitation and is capable of stably detecting the reproducing area of a disk, since it detects the number of pulses of reproduced signal contained in one period or one pulse duration of the frequency signal having a frequency corresponding to the rotation speed of the motor and the reproduced signal read out from the disk, and detects electronically a reproducing position on the disk by comparing the detected number of pulses with a reference value predetermined according to a radial position on the disk.

BRIEF DESCRIPTION OF THE DRAWINGS

FIG. 11 is a circuit diagram showing an auxiliary circuit for an example of a reproducing area detecting circuit in an embodiment of the invention, FIGS. 12(a)–(c) constitute a waveform diagram showing input and output waveforms of the circuit shown in FIG. 11 in case a disk is accessed from the inner area to the outer area thereof, FIGS. 13(a)–(c) constitute a waveform diagram showing input and output waveforms of the circuit shown in FIG. 11 in case a disk is accessed from the outer area toward the inner area, FIG. 17 is a block diagram showing detection of a reproducing position of a disk in the conventional information reproducing apparatus.

DESCRIPTION OF THE PREFERRED EMBODIMENTS

Figure 1:
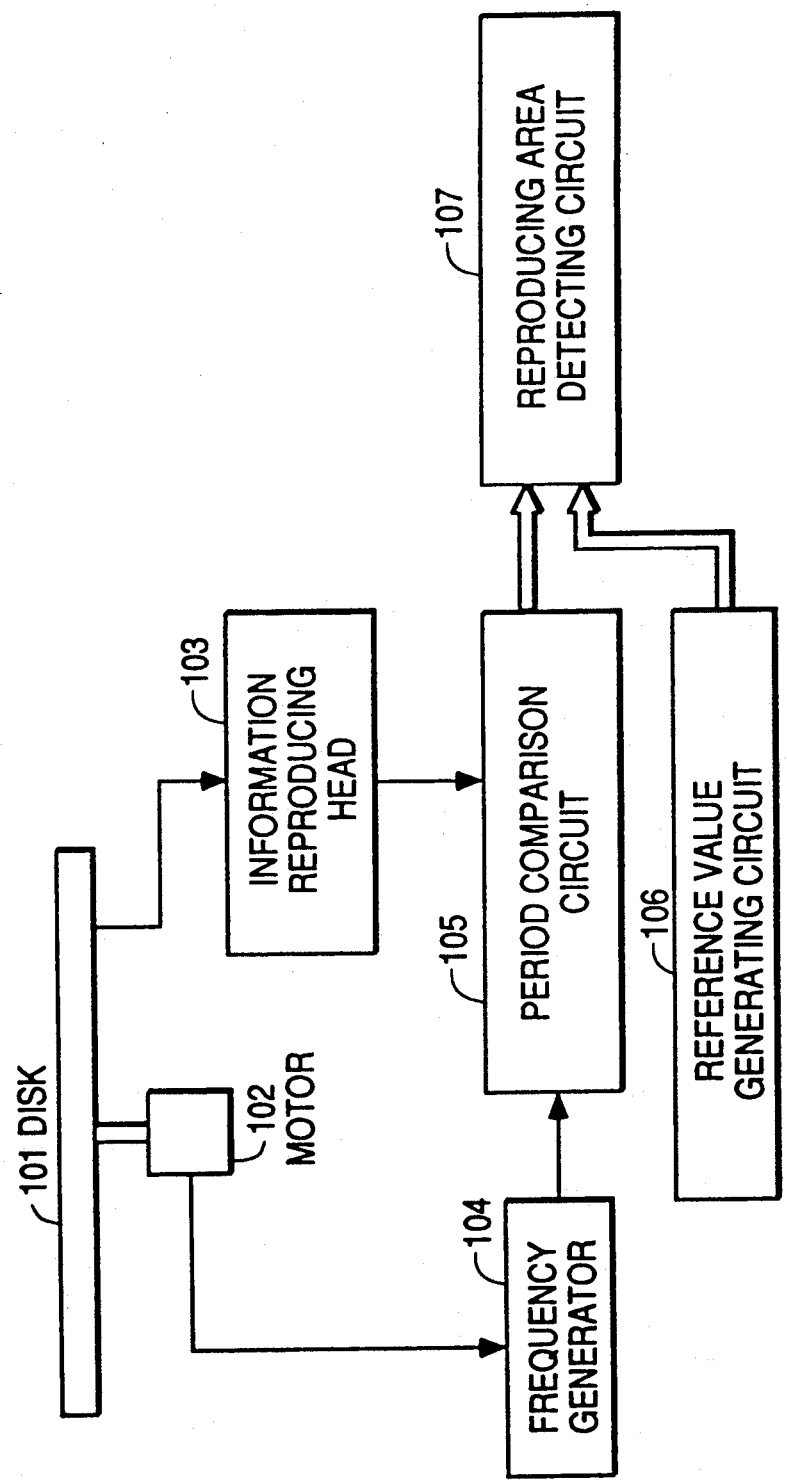
FIG. 1 is a block diagram showing an embodiment of the invention.
Figure 2:
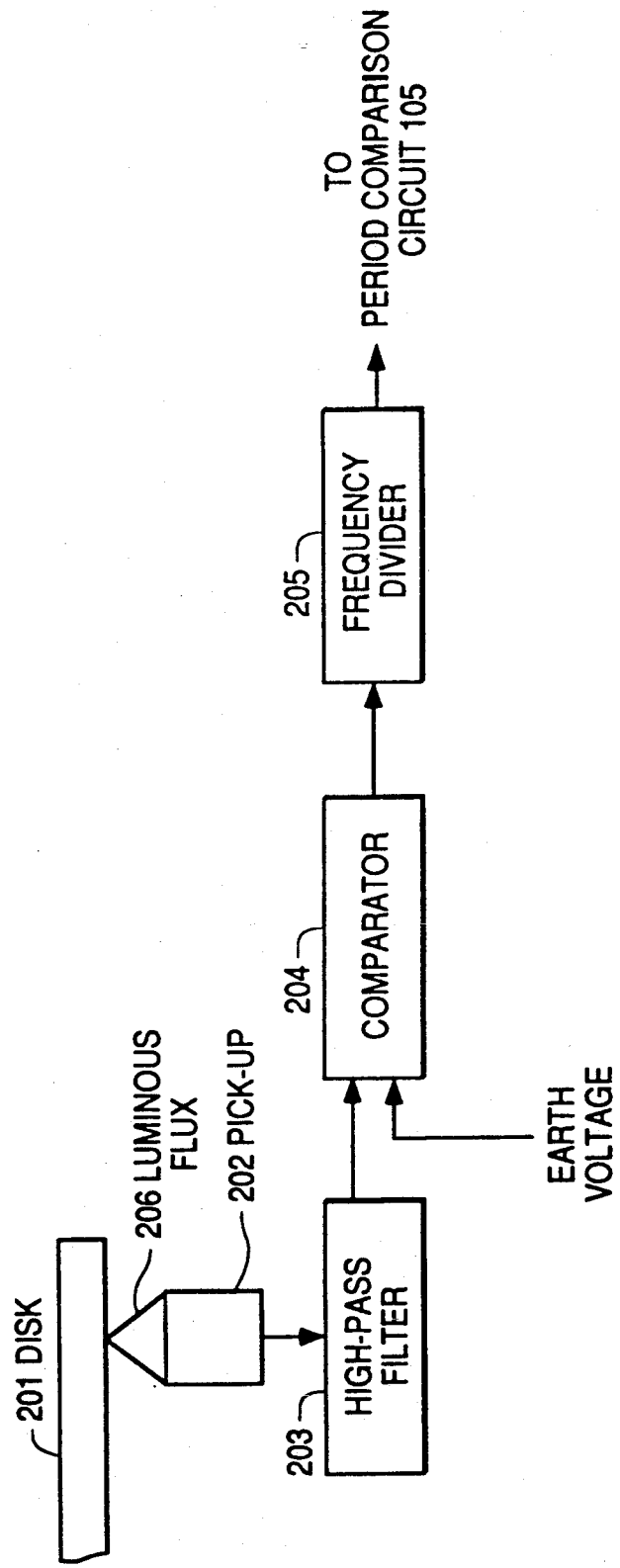
FIG. 2 is a block diagram showing an information reproducing head in the embodiment of the invention, FIGS. 3(a) and (b) constitute a waveform diagram showing a video signal from which a low frequency component is removed and a signal outputted from a comparator, FIGS. 4(a) and (b) constitute a waveform diagram showing a signal generated by the information reproducing head, and an FG signal generated by a frequency generator in the embodiment of the invention.

FIG. 1 is a block diagram of an information reproducing apparatus in an embodiment of the invention. A disk 101, which is mounted on a shaft of a motor 102 and having information recorded thereon at approximately a constant linear velocity, is rotated by the motor 102. From the rotating disk 101, information is read out with an information reproducing head 103 to generate a reproduced signal. As an example, a case is explained in which a radio frequency (RF) signal of video signal recorded on the optical video disk is generated as the reproduced signal. The information reproducing head 103 may be composed, as shown FIG. 2 for instance, of a pick-up 202, a high-pass filter 203, a comparator 204, and a frequency divider 205. The video signal (FM video signal) recorded after being subjected to frequency modulation is read out by focusing a light flux 206 on a disk 201 via a pick-up 202 and permitting a reflected light from the disk 201 to be received by the pick-up 202. From the FM video signal thus read, a low frequency component is removed by a high-pass filter 203. A comparator 204 compares the level of the video signal, from which the low frequency component is removed, with an earth voltage to generate a digital signal. Without using the high-pass filter 203, the output signal from pick-up 202 may be compared with a reference voltage corresponding to the direct current component of the read-out RF signal.

FIG. 3, (a) is a waveform diagram of the video signal from which the low frequency component is removed by the high-pass filter 203, and FIG. 3(b) is a waveform diagram of the output signal of the comparator 204. The RF signal, which is a high frequency signal of 8 MHz-9 MHz, is divided by the frequency divider 205. In this example, the dividing ratio of the RF signal is set at 134.

On the other hand, referring again to FIG. 1, a frequency generator 104 generates a frequency signal (FG signal) having a frequency corresponding to the number of rotations of the motor 102.

FIG. 4 is a waveform diagram showing the relation between the output signal (FIG. 4(a)) of the information reproducing head 103 and the FG signal (FIG. 4(b)). In this example, the frequency generator 104 generates, as the FG signal, 60 pulse per 1 rotation of the motor 102. The number of pulses of the divided RF signal generated during 1 period of the FG signal is somewhat varied due to frequency modulation of the FG signal. In the case of a constant linear velocity disk of 30 cm in diameter, the number of pulses of the divided RF signal is 34-36 pulses at the inner-most track and 78-81 pulses at the outer-most track.

Figure 5:
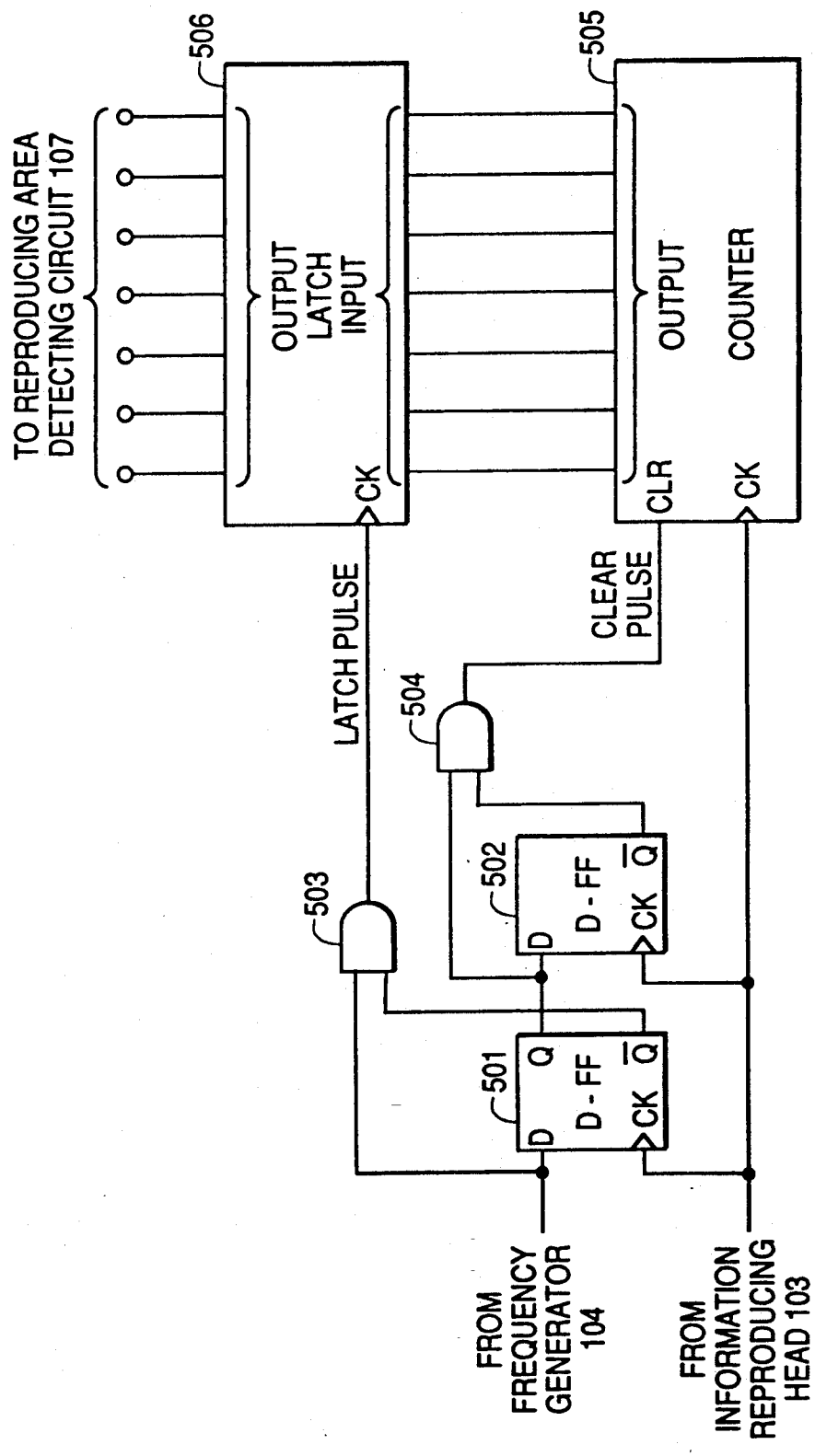
FIG. 5 is a block diagram showing an example of a period comparison circuit in the embodiment of the invention, FIGS. 6(a)–(h) constitute a timing chart of signals in the period comparison circuit shown in FIG. 5.
Figure 6:
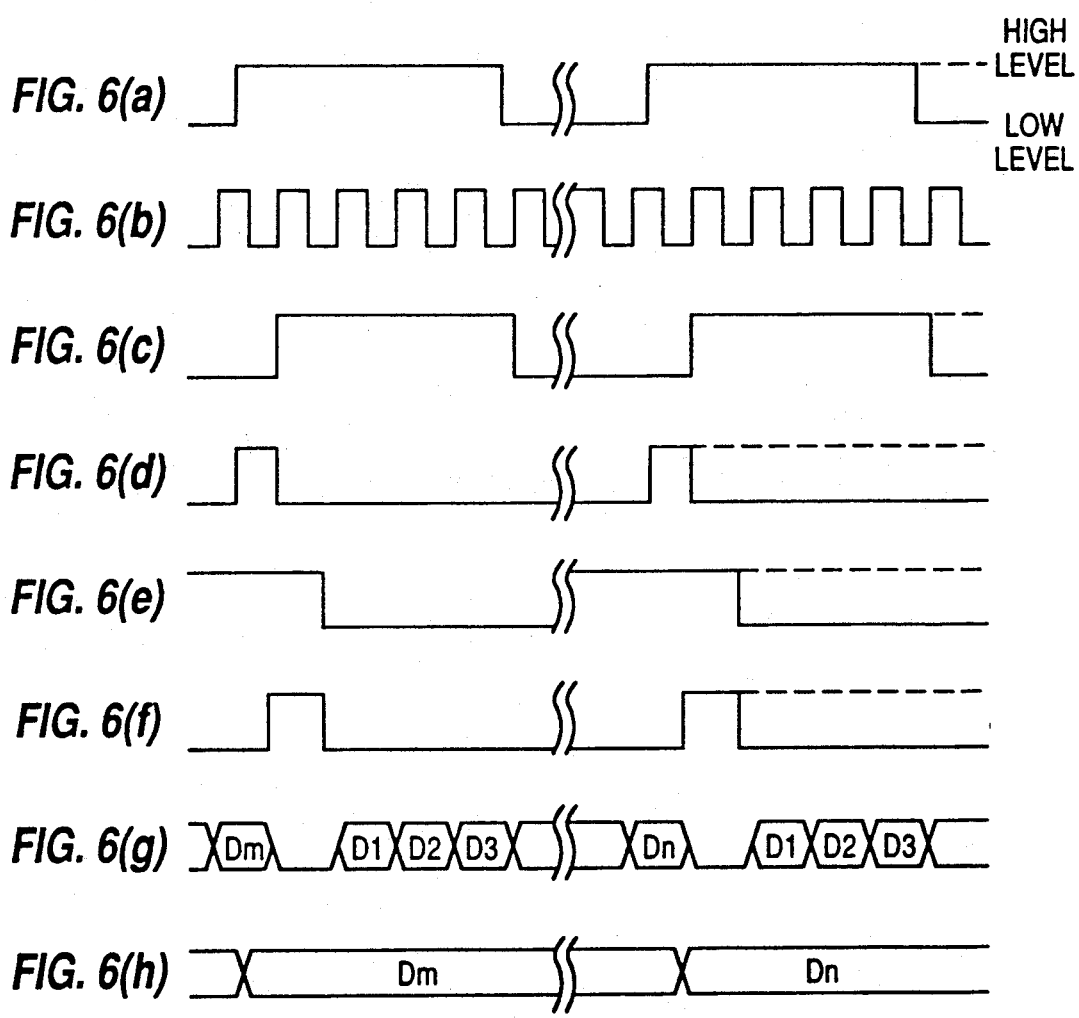

FIG. 5 is a block diagram of an example of a period comparison circuit 105 which detects the number of pulses of the divided RF signal generated during 1 period of the FG signal. FIG. 6 is a timing chart of signals in the circuit of FIG. 5, where FIG. 6(a) is the FG signal, and FIG. 6(b) is the divided RF signal. When the FG signal and the divided RF signal are applied to a D-flip-flop (D-FF) circuit 501, a signal synchronized with the divided RF signal, as shown by FIG. 6(c) is generated from the D-FF circuit 501. FIG. 6(e) depicts an inverted output from a D-FF circuit 502 which receives the output of the D-FF circuit 501. Accordingly, an output of an AND gate 504 which receives the output of the D-FF circuit 501 and the inverted output of the D-FF circuit 502 becomes as shown by FIG. 6(f). The output from the AND gate 504 is fed to a counter 505 as a clear pulse. An output data of counter 505 is cleared when the clear pulse becomes a high level. When the clear pulse becomes a low level, the counter 505 counts the pulses of the divided RF signal inputted thereto. FIG. 6(g) shows the state where the output data of the counter 505 increases by an increment of 1 in response to each input of a pulse of the divided RF signal.

On the other hand, FIG. 6(d) depicts an output of and AND gate 503 which receives the FG signal and the inverted output of the D-FF circuit 501. This output of the AND gate 503 is applied to a latch circuit 506 as a latch pulse for latching the output data of the counter 505. The output data of the counter 505 is latched in synchronization with a rising edge of the latch pulse, and the latched data is kept until the timing at which a next data is latched as shown by FIG. 6(h).

In the case of a constant linear velocity disk, wherein information is recorded at a constant linear velocity, the number of pulses of the RF signal read out from the disk 101 per rotational angle increases as the head moves from the inner area toward the outer area of the disk. Namely, the number of the pulses of the divided signal of the RF signal read out from the disk 101 during 1 period of the FG signal generated from the frequency generator 104 increases as the head moves from the inner area to the outer area of the disk 101. Thus, the output of the latch circuit 506 has a value corresponding to the reproducing position on the disk.

By utilizing this relationship, in a reproducing area detecting circuit 107, the reproducing area is identified by comparing the output of the latch circuit 506 with a predetermined number of pulses (predetermined reference value) of the divided RF signal generated during 1 period of the FG signal, corresponding to a predetermined radial position of the disk. The reference value is generated by a reference value generating circuit 106 as shown in FIG. 1.

Figure 7:
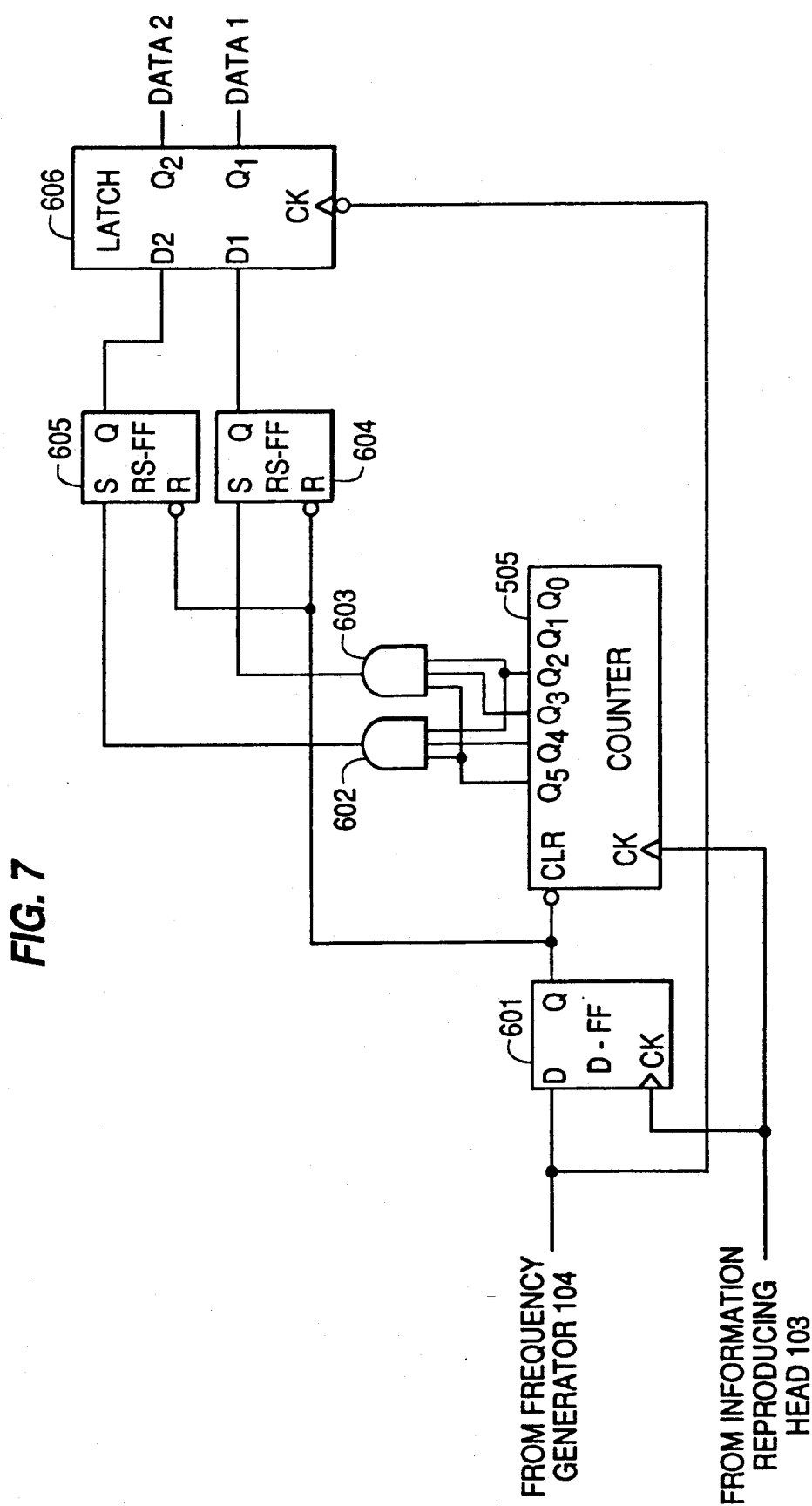
FIG. 7 is a block diagram showing another example of the period comparison circuit and a reproducing area detecting circuit.
Figure 8A:
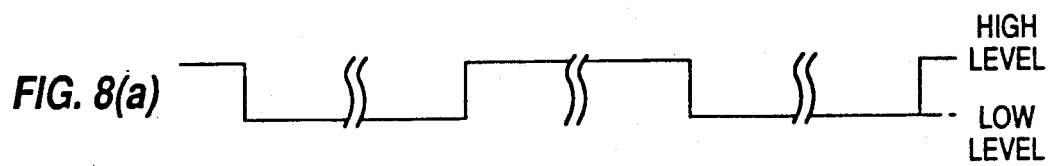
FIGS. 8(a)–(h), 9(a)–(h) and 10(a)–(h) are timing charts of signals in the circuit shown in FIG. 7.
Figure 8B:
Figure 8C:
Figure 8D:
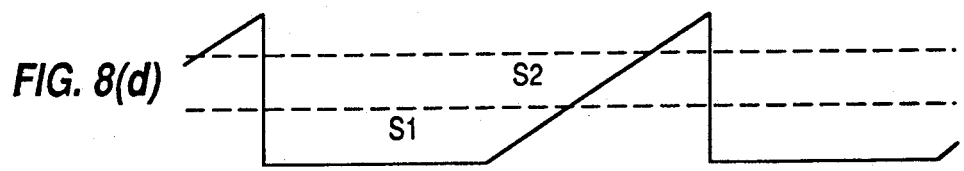
Figure 8E:
Figure 8F:
Figure 8G:
Figure 8H:
Figure 9A:
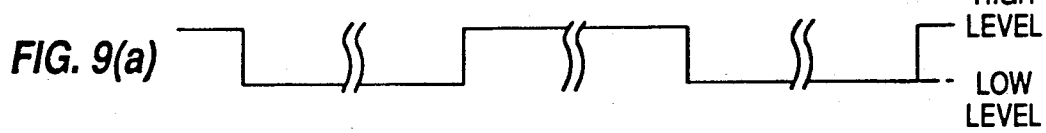
Figure 9B:
Figure 9C:
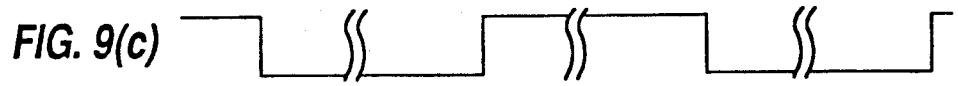
Figure 9D:
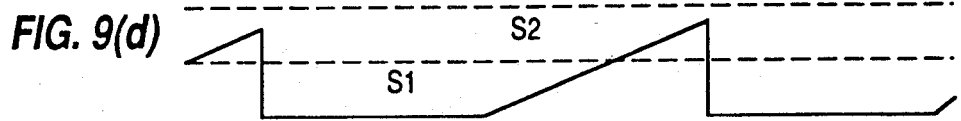
Figure 9E:
Figure 9F:
Figure 9G:
Figure 9H:
Figure 10A:
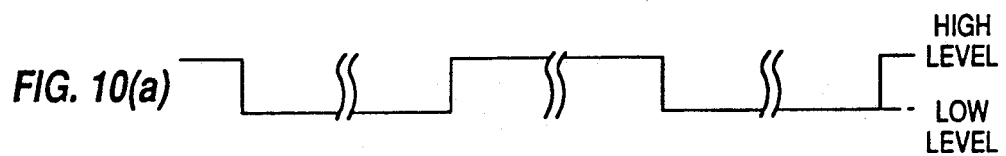
Figure 10B:
Figure 10C:
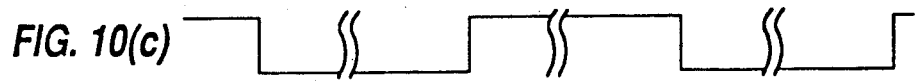
Figure 10D:
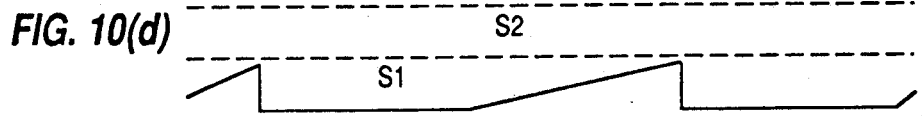
Figure 10E:
Figure 10F:
Figure 10G:
Figure 10H:

FIG. 7 is a block diagram of another example of the period comparison circuit 105 and reproducing area detecting circuit 107 constituted so as to compare the output value of the counter 505 with the above mentioned predetermined reference value. FIG. 8, FIG. 9 and FIG. 10 each depict a timing chart of signals in the circuit of FIG. 7, FIGS. 8(a), 9(a) and 10(a) denoting the FG signal and FIGS. 8(b), 9(b) and 10(b) denoting the divided RF signal. First, a case is explained in which an area near the periphery of the disk is reproduced. When the divided RF signal of FIG. 8(b) is fed to a D-FF circuit 601, a signal synchronized with the divided RF signal as shown by FIG. 8(c) is generated. The value of the counter 505 is cleared when the signal generated by the D-FF circuit 601 becomes a low level. The count value of counter 505 is increased by 1 each time when a pulse of the divided RF signal is inputted thereto, after the signal generated by the D-FF circuit 601 has changed to a high level. This state is shown by FIG. 8(d). When the count value of the counter 505 is increased and all inputs to an AND gate 603 become a high level (state S1), the output of an RS-flip-flop circuit (RS-FF circuit) 604 becomes a high level as shown by FIG. 8(e). When the count value of the counter 505 is further increased and all inputs to an AND gate 602 become a high level (state S2), the output value of an RS-FF circuit 605 becomes a high level as shown by FIG. 8(f). The output of each of the RS-FF circuits 604, 605 becomes a low level when a low level signal from the D-FF circuit 601 is applied to its reset input. The outputs from the RS-FF circuits 604 and 605 are latched at a falling edge of the FG signal by a latch circuit 606 to generate DATA 1, DATA 2 as shown respectively FIG. 8(g) and (h).

FIG. 9 and FIG. 10 are time charts each showing a case in which the reproducing area is further inward on the disk than the area where the signals as shown in FIG. 8 are obtained. The signals of FIGS. 9(a) to (g) FIGS. 10(a) to (h) corresponding respectively to those of FIG. 8(a) to (h).

FIG. 9 shows a case wherein an area between the disk position determined by the above mentioned state S1 and that determined by state S2 is reproduced. In this case, the output value of the counter 505 is counted up to the above mentioned S1 state, but not to the S2 state. Accordingly, the RS-FF circuit 604 generates pulses as shown by FIG. 9(e), while the output from the RS-FF circuit 605 is kept at a low level as shown by FIG. 9(f). Thus, when the outputs of the RS-FF circuits 604, 605 are latched at the falling edge of the FG signal by the latch circuit 606, DATA 1, which is an output from the latch circuit 606 as shown by FIG. 9(g) becomes a high level, and DATA 2 becomes a low level as shown by FIG. 9(h).

FIG. 10 shows a case wherein an inner side area of the disk position determined by the above mentioned state S1 is reproduced. In this case, the output value of the counter 505 is not counted up to the S1 level. Accordingly, the outputs of the RS-FF circuits 604 and 605 are both kept at low levels. Thus, DATA 1, DATA 2, which are output values of the latch circuit 606, both become low levels. Accordingly, in this example, it is possible to distinguish any one of three divided areas on the disk, by detecting DATA 1, DATA 2 which are outputs of the latch circuit 606. It is possible to distinguish any one of two divided areas on the disk by substituting the AND gates 602 and 603 with a single AND gate corresponding to one reference value.

When the period of the reproduced signal or the FG signal is varied, it is possible to set hysteresis corresponding to two kinds of reference values as described below.

FIG. 11 depicts an auxiliary circuit of the reproducing area detecting circuit 107 for setting hysteresis corresponding to two kinds of reference values. In FIG. 11, DATA 1 and DATA 2 are respectively DATA 1 and DATA 2 of FIG. 7. With the circuit shown in FIG. 11, if reproduction is carried out from the inner area to the outer area of the disk, the output of a NAND gate 703 becomes a high level when DATA 1 and DATA 2 inputted to a NAND gate 701 and a NOR gate 702 both become high levels and at this time it is determined that the reproducing position of the disk is shifted from the inner area to the outer area. FIG. 12 shows this states, in which FIG. 12(a) is a signal waveform of DATA 1, FIG. 12(b) a signal waveform of DATA 2 and 12(c) an output waveform of the NAND gate 703. In the case where reproduction is carried out from the outer area to the inner area of the disk, when DATA 1 and DATA 2 which are inputted to the NAND gate 701 and the NOR gate 702 both become low levels, the output of the NAND gate 703 becomes a low level, then it is determined that the reproducing position is shifted from the outer area to the inner area. This state is shown in FIG. 13, in which FIG. 13(a) is signal waveform of DATA 1, FIG. 13(b) is a signal waveform of DATA 2 and FIG. 13(c) is a signal waveform of the output of the NAND gate 703.

In the above embodiment, the period comparison circuit is arranged to detect the number of pulses of the divided RF signal generated during one period of the FG signal. However, detecting the pulses generated during more than one period of the FG signal is basically similar to that for one period. It is readily apparent that a modification can be made so as to detect the number of pulses of the RF signal generated during two or more periods of the FG signal. Further, the case has been explained in which 60 pulses of FG signal is generated per one rotation of the motor, but the invention is not limited to this case. Further, though the dividing ratio has been set to 134, other division ratios can be set, not limited to the former value, within the scope of the invention. The signal may be the RF signal itself if recording has been made with FM modulation having little frequency deviation, or the signal may be other signals superposed in a low frequency area.

A second embodiment will be explained below.

Figure 14:
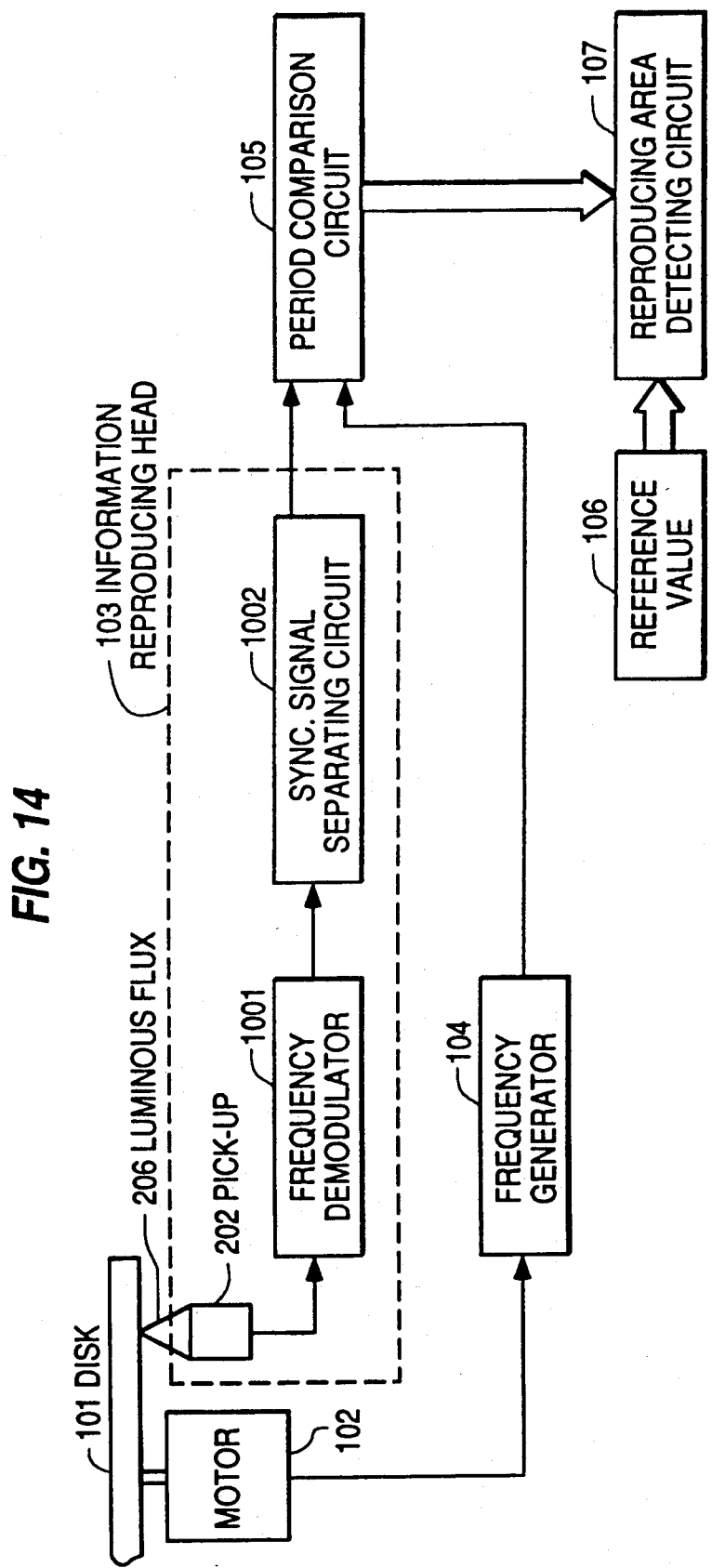
FIG. 14 is a block diagram showing an information reproducing apparatus in another embodiment of the invention, FIGS. 15(a)-(b) constitute a waveform diagram showing a video signal demodulated by a frequency demodulator, and an output of a synchronous signal separating circuit in the embodiment shown in FIG. 14, FIGS. 16(a) and (b) constitute a waveform diagram showing an output signal of an information reproducing head, and an FG signal in the FIG. 14 embodiment.

FIG. 14 is a block diagram showing an information reproducing apparatus in the second embodiment. In this embodiment, an example is described wherein the reproduced signal is the horizontal synchronizing signal of the video signal recorded on an optical video disk.

In the case of the optical video disk on which an FM video signal is recorded, a frequency demodulator is required in the reproducing system. Accordingly, as shown in FIG. 14, the information reproducing head 103 may be comprised by a pick-up 202, an FM demodulator 1001 and a synchronizing signal separating circuit 1002. In FIG. 14, the FM video signal recorded on the disk 101 is read out by focusing a luminous flux 206 onto the disk 101 and receiving a reflected light from the disk 101 via the pick-up 202. The FM video signal thus read out is demodulated by the FM demodulator 1001 to obtain a video signal which varies the level thereof corresponding to brightness. The video signal is fed into a synchronizing signal separating circuit 1002. The synchronizing signal separating circuit 1002 separates the horizontal synchronizing signal from the video signal, and generates a signal which becomes a high level, for example, only during the sync tip level period of the video signal, by keeping the sync tip level of the separated synchronizing signal at a constant voltage. This state is shown in FIG. 15. In FIG. 15(a) is a waveform diagram of the video signal demodulated by the FM demodulator 1001, and FIG. 15(b) is a waveform diagram of the output signal of the synchronizing signal separating circuit 1002.

On the other hand, a frequency generator 104 shown in FIG. 14 generates a frequency signal (FG signal) having a frequency corresponding to the number of rotations of the motor 102. The number of pulses based on the horizontal synchronizing signal, generated during 1 period of the FG signal, and issued from the information reproducing head 103, is detected by the period comparison circuit 105. FIG. 6 is a waveform diagram showing the relation between the output signal of the information reproducing head 103 and the FG signal, in which FIG. 16(a) is a waveform diagram of the output signal of the information reproducing head 103, and FIG. 16(b) a waveform diagram of the FG signal.

The period comparison circuit 105, reference value generating circuit 106, and reproducing area detecting circuit 107 are composed similarly to those in the first embodiment. In the circuits of the first embodiment, a signal based on the synchronizing signal may be fed to the input part to which the divided RF signal in fed. In the second embodiment, the number of pulses of the horizontal synchronizing signal generated during 1 period of the FG signal is, in the case of a constant linear velocity disk, 8-9 pulses at the innermost truck, and 22-24 pulses at the outermost track, for example. By the composition as above described, it is possible to distinguish that the reproducing position on the disk is shifted from an area to another area by the output from the reproducing area detecting circuit.

In application of the invention, the reproduced signal to be issued from the information reproducing head 103 may be any signal recorded at approximately constant intervals on the tracks of the disk. Further, in the above embodiments, two- or three-divided areas on the disk are is distinguished, but the number of areas to be distinguished may be increased by using a larger number of reference values.

What is claimed is:

1. An information reproducing apparatus comprising:
a motor for rotating a disk having recorded thereon at an approximately constant linear velocity a high frequency signal carrying information to be reproduced;
an information reproducing head for reproducing the recorded high frequency signal from the disk to generate a reproduced high frequency signal;
frequency generating means for generating a frequency signal having a frequency corresponding to the number of rotations of the motor;
period comparison means for comparing a period of the frequency signal generated by the frequency generating means with a period of the reproduced high frequency signal; and
reproducing area detecting means for detecting a reproducing area on the disk by comparing an output value from the period comparison means with a predetermined reference value.

2. An information reproducing apparatus comprising:
a motor for rotating a disk having recorded thereon at an approximately constant linear velocity a high frequency signal carrying information to be reproduced;
a pick-up for reproducing the recorded high frequency signal from the disk to obtain a reproduced high frequency signal;
a comparator for producing a high frequency pulse signal by comparing an amplitude of the reproduced high frequency signal from the pick-up with a reference voltage;
frequency generating means for generating a frequency signal having a frequency corresponding to the number of rotations of the motor;
period comparison means for comparing a period of the high frequency pulse signal from the comparator with a period of the frequency signal; and
reproducing area detecting means for comparing an output value from the period comparison means with a predetermined reference value to detect a reproducing area on the disk.

3. An information reproducing apparatus comprising:
a motor for rotating a disk having recorded thereon at an approximately constant linear velocity a high frequency signal carrying information to be reproduced;
a pick-up for reproducing the recorded high frequency signal from the disk;
a filter circuit for removing a low frequency component from an output signal from the pick-up;
frequency generating means for generating a frequency signal having a frequency corresponding to the number of rotations of the motor;
period comparison means for comparing a period of an output signal from the filter circuit with a period of the frequency signal; and
reproducing area detecting means for detecting a reproducing area on the disk by comparing an output value from the period comparison means with a predetermined reference value.

4. An information reproducing apparatus comprising:
a motor for rotating a disk having information in the form of a frequency-modulated signal recorded thereon at an approximately constant linear velocity;
a pick-up for reproducing the recorded frequency-modulated signal from the disk;
a frequency demodulator for demodulating the frequency-modulated signal from the pick-up;
a synchronous signal separating circuit for separating a synchronous signal from the signal demodulated by the frequency demodulator;
frequency generating means for generating a frequency signal having a frequency corresponding to the number of rotations of the motor;
period comparison means for comparing a period of the synchronous signal from the synchronous signal separating circuit with a period of the frequency signal; and
reproducing area detecting means for detecting a reproducing area on the disk by comparing an output value from the period comparison means with a predetermined reference value.

5. An information reproducing apparatus comprising:
a motor for rotating a disk having recorded thereon at an approximately constant linear velocity a high frequency signal carrying information to be reproduced;
an information reproducing head for reproducing the recorded high frequency signal from the disk to generate a reproduced high frequency signal;
frequency generating means for generating a frequency signal having a frequency corresponding to the number of rotations of the motor;
period comparison means for comparing a period of the frequency signal generated by the frequency generating means with a period of the reproduced high frequency signal;
reproducing area detecting means for detecting a reproducing area on the disk by comparing an output value from the period comparison means with predetermined first and second reference values, the second reference value being larger than the first reference value, wherein the reproducing area detecting means, in a case where the disk is reproduced from an inner area to an outer area thereof, detects that the reproducing position is shifted from the inner area to the outer area when the output value of the period comparison means becomes larger than the second reference value, and, in a case where the disk is reproduced from the outer area to the inner area, detects that the reproducing position is shifted from the outer area to the inner area when the output value from the period comparison means becomes smaller than the first reference value.

* * * * *